(12) United States Patent
Newman et al.

(10) Patent No.: US 10,309,710 B2
(45) Date of Patent: Jun. 4, 2019

(54) CONFIGURABLE SPIRAL FREEZER

(71) Applicants: Michael D. Newman, Hillsborough, NJ (US); Stephen McCormick, Warrington, PA (US)

(72) Inventors: Michael D. Newman, Hillsborough, NJ (US); Stephen McCormick, Warrington, PA (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 15/962,346

(22) Filed: Apr. 25, 2018

(65) Prior Publication Data

US 2018/0238601 A1 Aug. 23, 2018

Related U.S. Application Data

(63) Continuation of application No. 15/387,840, filed on Dec. 22, 2016, now Pat. No. 9,982,934.

(51) Int. Cl.
| | |
|---|---|
| *B65G 21/18* | (2006.01) |
| *F25D 3/11* | (2006.01) |
| *F25D 13/06* | (2006.01) |
| *F25D 17/06* | (2006.01) |

(52) U.S. Cl.
CPC .............. *F25D 3/11* (2013.01); *B65G 21/18* (2013.01); *F25D 13/067* (2013.01); *F25D 17/06* (2013.01); *F25D 2317/0682* (2013.01)

(58) Field of Classification Search
CPC ....... B65G 21/18; B65G 2207/24; F25D 3/11; F25D 13/067
USPC ........................................................ 198/778
See application file for complete search history.

(56) References Cited

U.S. PATENT DOCUMENTS

| | | | |
|---|---|---|---|
| 3,733,848 | A | 5/1973 | Duron et al. |
| 4,319,460 | A | 3/1982 | Williams |
| 4,324,110 | A | 4/1982 | Lovette, Jr. et al. |
| 4,370,861 | A | 2/1983 | Lovette, Jr. et al. |
| 4,953,365 | A | 9/1990 | Lang et al. |
| 5,031,751 | A | 7/1991 | Pahlsson |

(Continued)

OTHER PUBLICATIONS

International Search Report for PCT/US2017/067200, dated Jan. 30, 2018, Authorized Officer: John Nguyen, 3 pages.

(Continued)

*Primary Examiner* — James R Bidwell
(74) *Attorney, Agent, or Firm* — Joshua L. Cohen; Philip H. Von Neida (57) ABSTRACT

A reconfigurable freezer includes a housing having an internal space therein, and first and second openings each in communication with the internal space; an infeed assembly and an outfeed assembly, the infeed assembly constructed to be removably mounted to the housing at one of at the first and second openings for being in communication with the internal space, and the outfeed assembly constructed to be removably mounted to another of the first and second openings for being in communication with the internal space, wherein the infeed and outfeed assemblies are interchangeable at the first and second openings; a conveyor belt transiting the internal space from the infeed assembly to the outfeed assembly; and a drum disposed at the internal space for supporting movement of the conveyor belt about the drum between the infeed and outfeed assemblies.

81 Claims, 8 Drawing Sheets

(56) References Cited

U.S. PATENT DOCUMENTS

5,787,716 A     8/1998  Allen, Jr.
7,757,837 B2    7/2010  Jones
9,982,934 B1 *  5/2018  Newman ................ B65G 21/18

OTHER PUBLICATIONS

Written Opinion of International Search Authority for PCT/US2017/067200, dated Jan. 30, 2018, Authorized Officer: John Nguyen, 3 pages.
European Search Report for EP 17173164.9 dated Nov. 17, 2017, 7 pages.

* cited by examiner

CONFIGURABLE SPIRAL FREEZER

BACKGROUND

The present embodiments relate to cryogenic spiral freezers for chilling and/or freezing, for example, food products.

Cryogenic spiral freezers for freezing food products, for example, have been known since approximately 1970. Such known type of freezer is provided and sold or leased in a single configuration only, i.e. having an inlet for product positioned lower than an elevated outlet, either a clockwise or counter-clockwise rotational drum (but not both), and a single throughput. Later modifications in the industry reversed the positions of the inlet and outlet relative to each other, i.e. arranged the inlet to be at a higher elevation than the outlet for the product, and the drums to rotate through different degrees of rotation, either clockwise or counter-clockwise. However, in all known constructions, a user selected a particular configuration and accordingly, each spiral freezer was constructed in that particular single configuration.

With respect to existing and known spiral freezer configurations, any single configuration of the freezer selected by the user for product freezing would have to be redesigned by designers and engineers in order to reconfigure the freezer for different product use or operation at a different facility. Such reconfiguration would include at least disassembling the existing freezer, cutting and rewelding an internal framework and wall panels of the freezer to accommodate the new configuration, and then reassembling the freezer for subsequent testing and installation at a customer site, followed by commissioning prior to commercial operation. All of this work consumes at least three months for the fabrication and therefore, reconfiguring known freezers would take from between three to nine months of design time, plus an additional three months of fabrication time in order to obtain the reconfigured freezer for the desired application and/or facility. Such reconfiguration consumes many internal resources, additional fabrication time and workshop space.

SUMMARY

There is therefore provided an octagonally shaped spiral freezer box constructed to enable inlets and outlets of same to be positioned in any one of a plurality of different wall faces of the freezer, such that different configurations of the freezer box and rotation of the freezer's spiral drum can be obtained without many months and the associated expense to reconfigure same for new users and operations.

Another embodiment permits belt tier reconfiguration, such that as many as two belt tiers can be added or removed from the drum. The present embodiments permit re-claimed freezers or those off-lease to be reconfigured for existing or other user(s) or customer(s).

The present embodiments include a spiral freezer having an octagonally-shaped freezer box that provides for an inlet and an outlet of the box to be positioned at any of four of the eight wall faces of the box, such that each of the four faces includes a similar connection member, thereby permitting both clockwise and counter-clockwise configuration, 90° configuration, 180° configuration, or straight-through configuration without having to re-design or reconfigure the freezer box. In effect, the present embodiments permit "on-the fly" reconfiguration of the freezer at a workshop in just a few days, instead of several months of work and the associated expenses with known spiral freezers.

The present embodiments provide interchangeable infeed and outfeed components removably mountable to a common meeting surface of the spiral freezer.

The present embodiments permit rapid reconfiguration of tier clearance of the belt along the spiral drum, such that as many as two additional tiers of the belt can be added or removed from the freezer drum.

The present embodiments enable an existing freezer to be reconfigured to a subsequent customer's desired configuration in approximately ten percent (10%) of the time that it would take to do so with the known freezer redesign/reconfiguration work; and to thereafter again reconfigure the freezer to return it to the former facility or a subsequent customer as is necessary.

The present embodiments therefore provide a reconfigurable freezer which includes a housing having an internal space therein, and first and second openings each in communication with said internal space; and an infeed assembly and an outfeed assembly, the infeed assembly constructed to be removably mounted to the housing at one of at the first and second openings for being in communication with said internal space, and the outfeed assembly constructed to be removably mounted to another of the first and second openings for being in communication with said internal space, wherein the infeed and outfeed assemblies are interchangeable at the first and second openings.

BRIEF DESCRIPTION OF THE DRAWINGS

For a more complete understanding of the present invention, reference may be had to the following description of exemplary embodiments considered in connection with the accompanying drawing Figures, of which.

DETAILED DESCRIPTION OF THE INVENTION

Before explaining the inventive embodiments in detail, it is to be understood that the invention is not limited in its application to the details of construction and arrangement of parts illustrated in the accompanying drawings, if any, since the invention is capable of other embodiments and being practiced or carried out in various ways. Also, it is to be understood that the phraseology or terminology employed herein is for the purpose of description and not of limitation.

In the following description, terms such as a horizontal, upright, vertical, above, below, beneath and the like, are to be used solely for the purpose of clarity illustrating the invention and should not be taken as words of limitation. The drawings are for the purpose of illustrating the invention and are not intended to be to scale.

As used herein, a "freezer box" or "box" refers to the outer insulated enclosure of the freezer which houses all mechanical components and contains cryogenic gas or gases to chill and/or freeze a product such as for example a food product.

Figure 1:
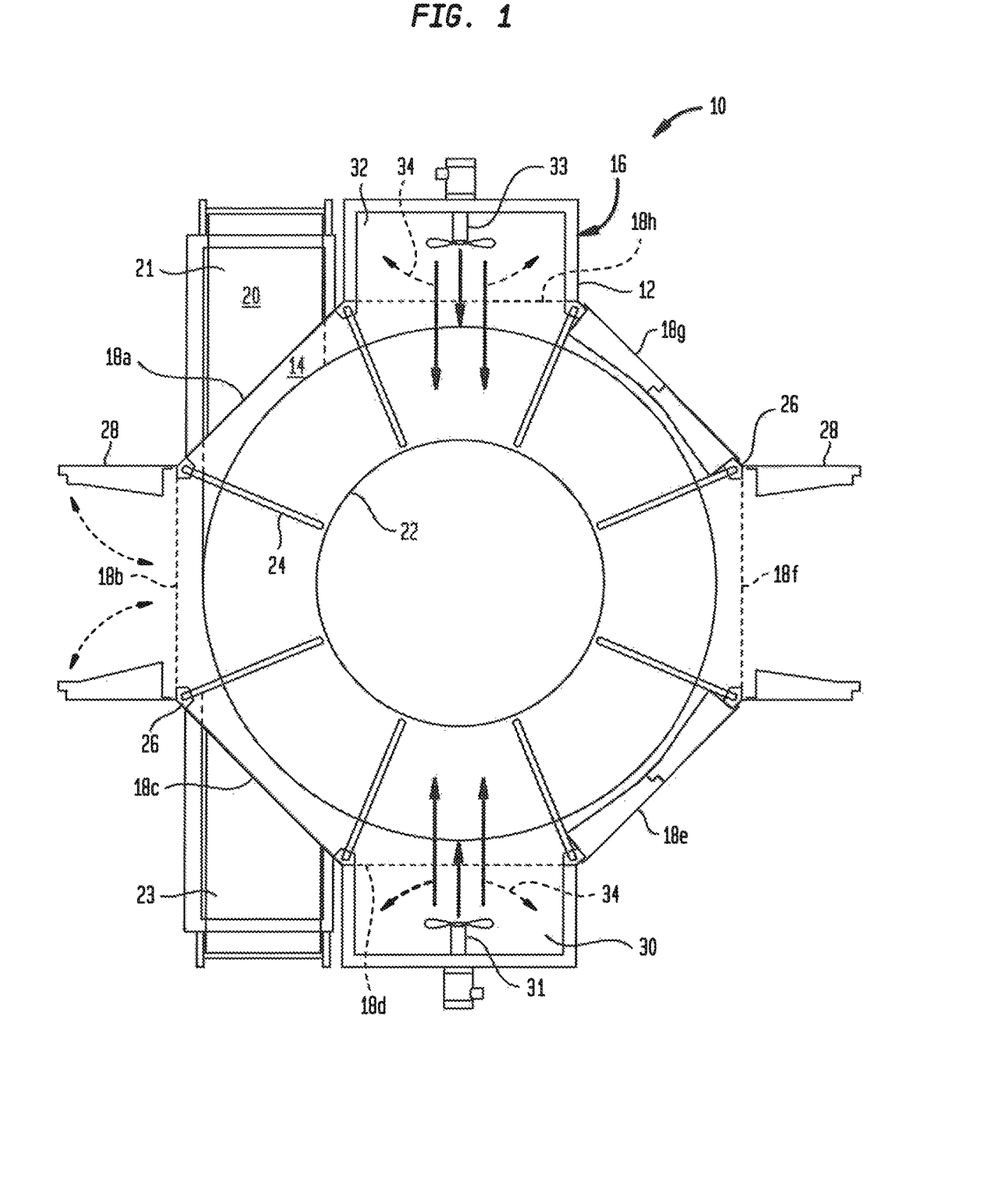
FIG. 1 shows a top schematic view of a configurable spiral freezer embodiment according to the present invention.

Referring to FIG. 1, there is shown a configurable spiral freezer apparatus 10 which includes a housing 12 or enclosure within which is provided an internal chamber 14 or space. The housing 12 with the chamber 14 at the interior thereof may also be referred to herein collectively as a freezer box 16 or box.

The freezer box 16 includes a plurality of for example eight (8) sides 18a-18h (octagonally-shaped). As shown in FIG. 1, the sides 18a-h provide for an octagonally-shaped freezer box, which is clearly represented for purposes of understanding herein by the broken lines at 18b, 18d, 18f and 18h.

At any one time four (4) of the sides 18a-h may be used as an inlet and/or as an outlet for the freezer box 16. That is, for example and referring to FIG. 1, in this configuration the side 18a can function as an inlet for infeed of product to be delivered by a conveyor belt 20 to the internal chamber 14 for chilling or freezing. The conveyor belt 20 includes a loading region shown generally at 21, and a discharge region shown generally at 23. The regions 21, 23 are with respect to that portion of the belt 20 before entering the freezer box 16 and exiting the freezer box, respectively. Another side 18c can function or operate as an outlet for the internal chamber 14 and from which the conveyor belt 20 departs. In effect, they conveyor belt 20 extends into the internal space 14 and wraps around a drum 22 supported by cantalievers 24 at the internal chamber 14 at that housing 12. The conveyor belt 20 is propelled or moved by the rotational aspect, either clockwise or counterclockwise, of the drum 22 whereupon the belt exits the freezer box 16 at the side 18c. As shown, the conveyor belt 20 entering the internal chamber 14 at the side 18a would be adding the lower elevation than that portion of the conveyor belt exiting the internal chamber at the side 18c.

Alternatively, the side 18c can function as the inlet in the internal chamber 14 of the freezer box 16 for the conveyor belt 20, in which case the drum 22 would be rotated in a clockwise direction for the conveyor belt to exit the internal chamber at the side 18a. Again, an inlet for the belt to the internal chamber 14 at the side 18c could be a lower elevation than the elevation of the belt departing the internal chamber at the side 18a.

A plurality of posts 26 positioned vertically or upright and therefore transversed to a direction of the conveyor belt 20, support the cantilevers which in turn support tiers of the conveyor belt 20 extending around the drum 22. The cantilevers 24 are not in contact with the drum 22 so that the drum can freely rotate, either in a clockwise or a counterclockwise direction, at the interior chamber 14 of the housing 12. By way of example only, a plurality of the cantilevers 24 can extend from each one of the posts 26.

Each one of the posts 26 also support doors 28. The doors 28 are each hingedly connected to the posts 26 and may be provided so that each one of the doors consists of a pair of panels movable with respect to each other such that in a closed position each one of the doors forms a side of the freezer box 16. That is, referring for example to FIG. 1, the doors 28 at each of the sides 18e and 18f are open to provide access to the internal chamber 14, the conveyor belt, the drum and the support cantilevers 24 for inspection, cleaning and maintenance thereof. The doors 28 at the sides 18e and 18g have their respective panels in the enclosed position. It is understood that one or more of the doors 28 may be opened or closed depending upon the operational, maintenance or repair aspects that are occurring with the freezer apparatus 10.

The freezer apparatus 10 also includes at least one and for certain applications a plurality of circulation devices 31, 33 (discussed also with respect to FIG. 4 below) or blowers which would be mounted for operation in the housing 12 at the internal chamber 14 proximate the sides 18d, 18h. The sides 18d, 18h may be extended outward as shown in FIG. 1, to include auxiliary spaces 30, 32 in which the blowers 30, 31, respectively, are disposed. That is, if the blower 31 is disposed in the auxiliary space 30, the auxiliary space 32 will be provided as a gas return region for atmosphere being circulated at the internal chamber 14 to chill or freeze food products. Similarly, if the auxiliary space 32 is provided with the blower 33 mounted therein, the auxiliary space 32 would then be provided as a gas turning region for the atmosphere being circulated within the internal chamber 14. In effect, only one of the blowers 31, 33 is needed. However, as indicated by arrow 34, each of the blowers 31, 33 can be turned or adjusted to direct its respective exhaust flow in a select position with respect to the conveyor belt 20 passing thereby. Further disclosure about the circulation of the atmosphere at the internal chamber 14 is provided in more detail below with respect to FIG. 4 and FIGS. 7A and 7B.

In summary, there is provided and disclosed at FIG. 1, an octagonally shaped spiral freezer apparatus 10 wherein four (4) of the side 18a-18h can be used in combinations as each of the inlet and the outlet while the remaining two sides would be provided with the doors 28 for inspection, cleaning, maintenance and repair at the interior of the housing 12. One of the sides 18a-18h is provided with a circuit gas circulation device such as for example a blower or axial fan, for moving a chilling gas such as for example a cryogenic gas at the internal chamber 14 and over the tiers of the conveyor belt 20 transporting the product through the freezer box 16. Concurrently therewith, another one of the sides 18a-18h is constructed as a gas turning area to return gas propelled or initiated from the circulation device across a bottom or lower half of the tiers of the conveyor belt and back to the circulation device. Finally, two of the sides 18a-18h may be provided with the doors 28 to provide access to the internal chamber 14 and components of the apparatus 10 disposed therein.

Figure 2A:
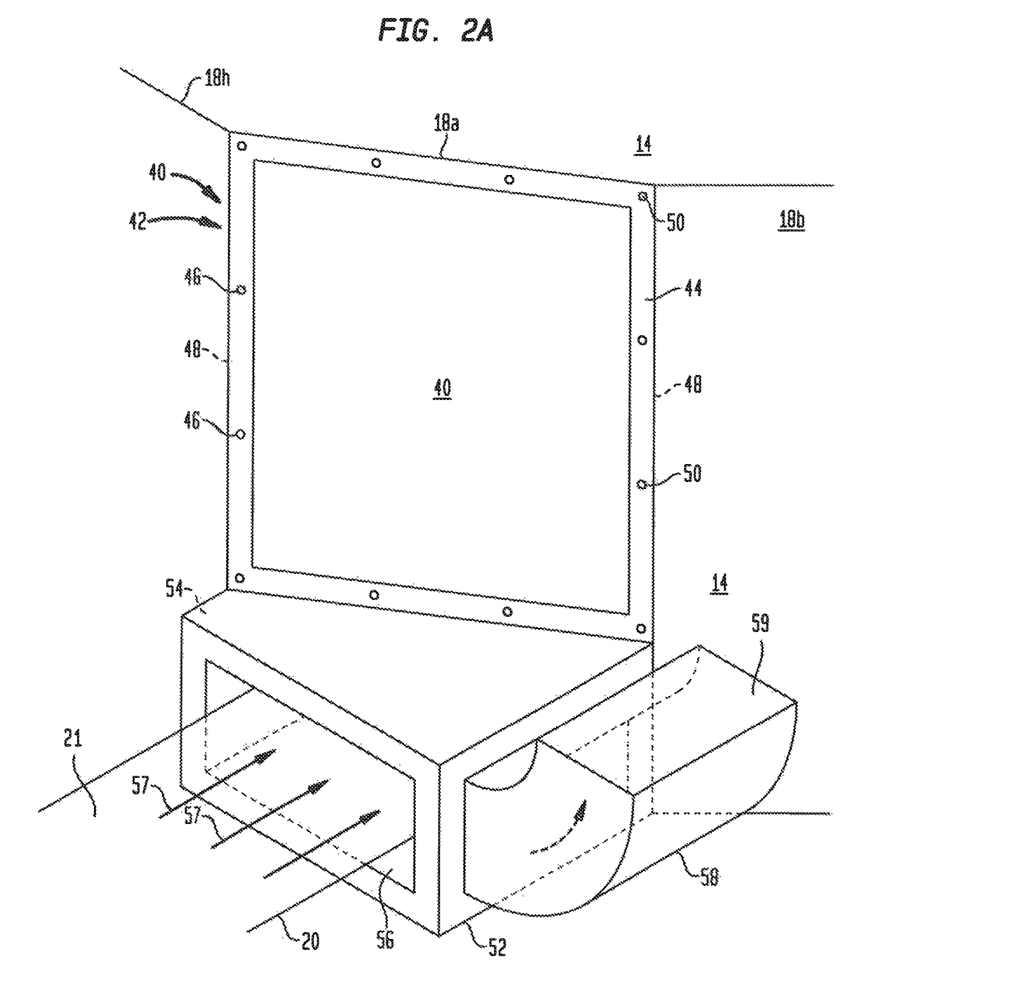
FIGS. 2A and 2B show perspective views of an infeed apparatus and an outfeed apparatus, respectively, of the configurable spiral freezer embodiments according to the present invention.
Figure 2B:
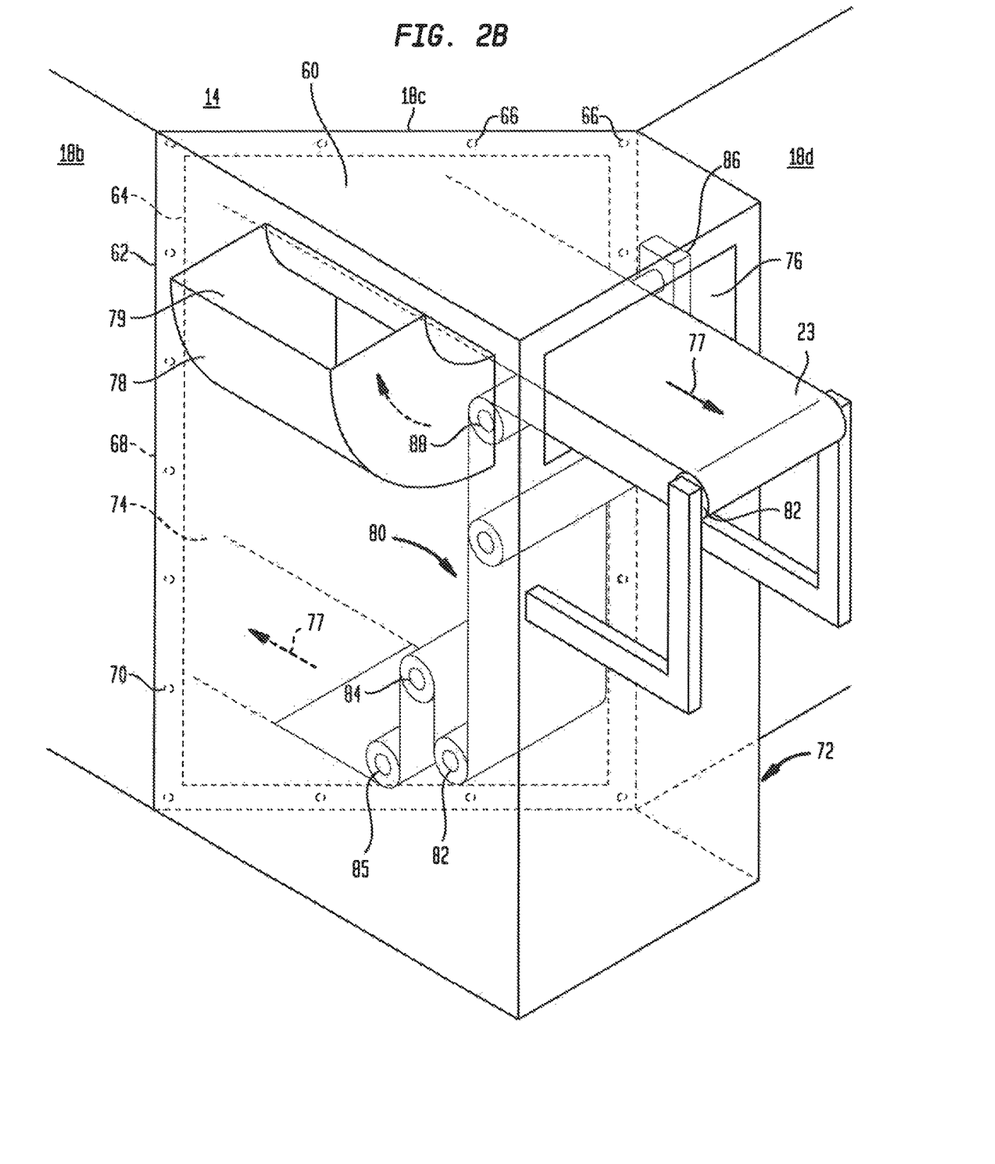

Referring also to FIGS. 2A and 2B, examples of the sides 18a-18h are shown which correspond to respective ones of the sides of the FIG. 1. As shown in FIG. 2A, the side 18a includes an inlet panel 40 constructed and arranged for being removably mounted to said side between the sides 18b and 18h. The inlet panel 40 includes a frame 42 with a perimeter 44 through which a plurality of mounting holes 46 are formed. The perimeter 44 of the frame 42 will overlap a corresponding edge 48 at the side 18a when mounted thereto, such that the perimeter 44 can be mounted to the edge 48 with mechanical fasteners 50 such as for example bolts, adaptor plates, locking nuts, and releasable latches.

Attached to a lower region of the inlet panel 40 or formed integral therewith is an infeed plenum 52 or enclosure in which is disposed an infeed space 54. The infeed plenum 52 also includes an infeed opening 56 into which the conveyor belt 20 extends for moving the product in the direction of the arrows 57. The infeed opening 56 is of a size and shape sufficient to permit the conveyor belt 20 with the product transported thereon to extend through the infeed space 54 and into the internal chamber 14. It is understood that the internal chamber 14 exists on the other side of the sides 18*a*, 18*b* and 18*h* due to the perspective shown in FIG. 2A. A related perspective of the internal chamber 14 is shown in FIG. 2B.

The infeed plenum 52 also includes an infeed exhaust 58 which is in fluid communication with the infeed space 54 as shown in FIG. 2A. The infeed exhaust 58 includes an exhaust opening 59 which permits removal of cryogenic gas from the internal chamber 14 of the freezer box 16 through the infeed plenum 52 to an atmosphere external to the freezer box and for most applications external to the factory or facility where the freezer apparatus 10 is disposed for operation. As mentioned above, the mechanical fasteners 50 can be used to removably mount the inlet panel 40 with the infeed plenum 52 as a part thereof to the freezer box 16. However, mechanical fasteners other than the bolts 50 can be used, as long as such mechanical fasteners provide for the relative ease of removably mounting the inlet panel 40 to the freezer box 16. As shown in FIG. 2A, the infeed plenum 52 is part of the panel 40 at a lower portion thereof. For this embodiment, the positioning of the plenum 52 is to receive or accommodate the conveyor belt 20 entering at a lower elevation with respect to the drum 22 than a departing end or the outlet portion 23 of the conveyor belt exiting the freezer box 16, as will be discussed hereinafter with respect to FIG. 2B.

Referring more specifically to FIG. 2B, there is shown the side 18*c* at which a discharge panel 60 is provided. As shown in FIG. 2B, the side 18*c* includes the discharge panel 60 constructed and arranged for being removably mounted to said side between the sides 18*b* and 18*d*. The discharge panel 60 includes a frame 62 with a perimeter 64 through which a plurality of mounting holes 66 are formed. The perimeter 64 of the frame 62 will overlap a corresponding edge 68 at the side 18*c* when mounted thereto, such that the perimeter 64 can be mounted to the edge 68 with mechanical fasteners 70 such as for example bolts, adapter plates, locking nuts or releasable latches.

Attached to the discharge panel 60 or formed integral therewith is an outfeed plenum 72 or enclosure in which is disposed an outfeed space 74. The outfeed plenum 72 also includes an outfeed opening 76 out of which the conveyor belt 20 extends for moving the product in the direction of the arrows 77. The outfeed opening 76 is of a size and shape sufficient to permit the conveyor belt 20 with the product transported thereon to depart from the outfeed space 74 out of the internal chamber 14.

The outfeed plenum 72 also includes an outfeed exhaust 78 which is in fluid communication with the outfeed space 74 as shown in FIG. 2B. The outfeed exhaust 78 permits removal of cryogenic gas from the internal chamber 14 of the freezer box 16 through the outfeed plenum 72 to an atmosphere external to the freezer box and for most applications external to the factory or facility where the freezer apparatus 10 is disposed for operation. As mentioned above, the mechanical fasteners 70 can be used to removably mount the discharge panel 60 with the outfeed plenum 12 as a part thereof to the freezer box 16. However, mechanical fasteners other than the bolts 70 can be used, as long as such mechanical fasteners provide for the relative ease of remov-ably mounting the discharge panel 60 to the freezer box 16. As shown in FIG. 2B, the outfeed plenum 72 forms a part of the panel discharge 60. For this embodiment, the positioning of the plenum 72 is to receive or accommodate the conveyor belt exiting at a higher elevation with respect to the drum 22 from the outfeed opening 76, than the inlet portion 21 of the conveyor belt 20 entering the freezer box 16.

The outfeed space 74 of the outfeed plenum 72 has a larger volume than the infeed space 54 of the infeed plenum 52. Referring still to FIG. 2B, the outfeed space 74 volume is sufficient to accommodate therein a drive apparatus for the conveyor belt 20 coming off of the drum 22 and thereafter being redirected to the drum and the infeed opening 56 such as to provide a continuous loop of the conveyor belt.

As can be seen from FIGS. 1 and 2A-2B, the inlet panel 40 and the discharge panel 60 are interchangeable at, for example, the sides 18*a*, 18*c* and for that matter, at any of the other sides 18*a*-18*h* as will be discussed hereinafter. That is, in FIGS. 1, and 2A-2B, the conveyor belt 20 enters the infeed opening 56 and is guided around the drum 22 while tiers of the belt are being supported on the plurality of support cantilevers 24 as said belt is moved or driven in for example a counterclockwise direction around the drum to be taken up at a drive apparatus 80 or assembly disposed in the outfeed space 74 of the discharge panel 60. The drive apparatus 80 includes a plurality of rollers 82, a tensioner 84 for the conveyor belt 20, and a drive motor 86 to drive the belt in a continuous loop for the freezer box 16. As shown in FIG. 2B, the outlet portion 23 of the conveyor belt 20 extends a short distance beyond the opening 76, wherein the belt is turned underneath around the roller 82 and back through the outfeed opening into the outfeed space 74 and along the plurality of rollers, the last one 85 of which directs the conveyor belt in the continuous loop to the side 18*a* and the inlet portion 21 just upstream of side 18*a*. In particular, the motor 86 drives the roller 88 to draw the belt in a counterclockwise direction off the drum 22 and guide the conveyor belt between and among the rollers 82 as described above. The roller 84 operates as a tensioner in order to maintain tension on the belt so that unwanted slack does not occur in the belt which would compromise belt operation and reliability of the freezer apparatus 10. The roller 88 is the drive roller for the belt and is operatively connected to the motor 86.

When the outlet portion 23 of the conveyor belt 20 emerges from the outfeed opening 76 with product thereon, said product falls under the effect of gravity on to another transport mechanism (not shown) such as another conveyor belt or transport apparatus to remove the product to a remote location for packaging or subsequent processing. The arrow 77 indicates a direction of movement of the conveyor belt 20 under the drawing effect of the motor 86.

Similarly, panels 40, 60 are interchangeable, and the direction of movement (clockwise or counterclockwise) of the drum 22 is reversible in the freezer box 16. That is, a user of the freezer apparatus 10 can mount the inlet panel 40 with the infeed plenum 52 instead to the side 18*c*, while the discharge panel 60 with the outfeed plenum 62 can instead be mounted to the side 18*a*, thereby providing for a reverse (or clockwise) direction of the flow of product being processed in the freezer box 16 of the apparatus 10. As can be seen from the present configurable freezer apparatus, practically no reconstruction or redesign of the actual apparatus has to be undertaken in order for the user of the apparatus to alter operation thereof depending upon floor space and product being processed by the freezer apparatus 10.

Four other exemplary embodiments of a configurable spiral freezer apparatus constructed in accordance with the present invention are illustrated in FIGS. 3-6, respectively. Elements illustrated in FIGS. 3-6 which correspond to the elements described above with respect to FIGS. 1 and 2A-2B have been designated by corresponding reference numerals increased by 100, 200, 300 and 400, respectively. The embodiments of FIGS. 3-6 are designed for use in the same manner as the embodiments of FIGS. 1 and 2A-2B unless otherwise stated.

Figure 3:
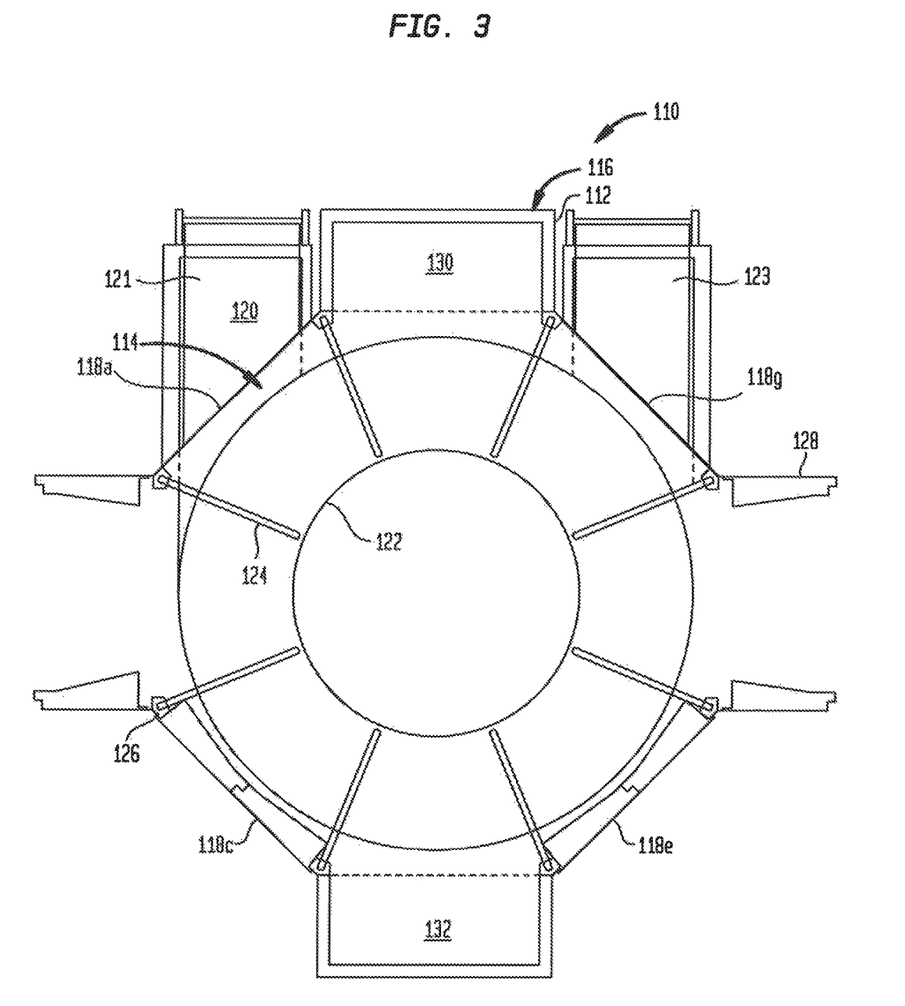
FIG. 3 shows a top schematic view of another embodiment of a configurable spiral freezer according to the present invention.

Referring now to FIG. 3, there is disclosed another embodiment of the freezer apparatus shown generally at 110. In this apparatus 110, the inlet portion 121 of the conveyor belt 120 is at the side 118a, while the outer portion 123 of the conveyor belt is at the side 118g. That is, the inlet portion 121 and the outlet portion 123 of the conveyor belt 120 are at the same side of the housing 112 for the freezer box 116. The freezer apparatus embodiment 110 includes the side 118c provided instead as doors 128, because the conveyor belt 120 has been reconfigured to not exit from that side but rather, to exit the internal chamber 114 through the side 118g. Accordingly, the inlet panel 40 shown in FIG. 2A would be removably mounted as the panel 140 to the side 118a, while the discharge panel 60 shown in FIG. 2B would be removably mounted as the panel 160 to the side 118g. Alternatively, the inlet panel 140 and the discharge panel 160 can be interchanged depending upon the direction (clockwise or counterclockwise) that the conveyor belt 120 would be moved around the drum 122. That is, if the embodiment 110 in FIG. 3 calls for the drum 122 to rotate counterclockwise, the arrangement and positioning of the panels 140, 160 shows infeed at the side 118a, and discharge or outfeed at the side 118g. If the drum were to rotate clockwise, then the inlet panel 140 would be removably mounted to the side 118g, while the discharge panel 160 would be removably mounted to the side 118a. In this latter "clockwise" arrangement, for example, the conveyor belt 120 could be "parted" or detached at a position along its length in order to re-thread the belt to enter the side 118g at an elevation lower than where the conveyor belt discharges product at a higher elevation from the side 118a.

Figure 4:
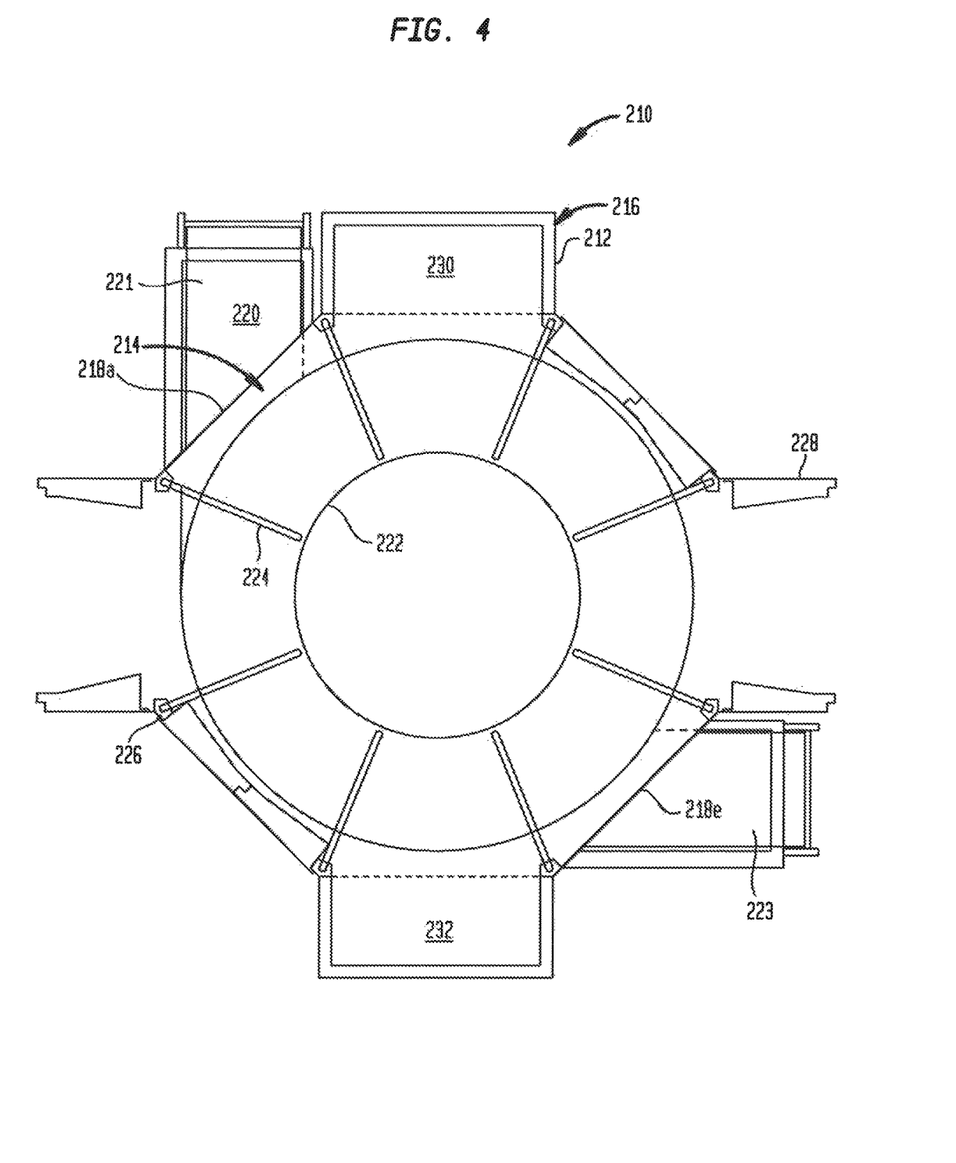
FIG. 4 shows a top schematic view of still another embodiment of a configurable spiral freezer according to the present invention.

FIG. 4 shows still another embodiment of the freezer apparatus shown generally at 210. In the embodiment of FIG. 4, the inlet panel 240 and the discharge panel 260 are disposed at ninety degrees)(90° with respect to each other. That is, the inlet panel 240 can be disposed at the side 218a while the discharge panel 260 can be disposed at the side 218e. As with the embodiments above, the inlet panel 240 and the discharge panel 260 are removably mountable to any of the sides 218a-218h and therefore, interchangeable such that the inlet and the outlet for the freezer box 216 can be at any one of the sides, provided that the inlet and the outlet are at: opposed sides of the freezer box 216, sides of the freezer box disposed ninety degrees (90°) with respect to each other, or at the same side of the freezer box 216.

Examples of combinations of the inlet and discharge (or outlet) arrangements for the freezer box of the present embodiments can be understood with respect to FIGS. 1, 2A-2B, and 3-7, and as follows:

TABLE I

| Inlet | Outlet | Drum Rotation |
|---|---|---|
| 18a | 18c | Counterclockwise |
| 18a | 18e | Counterclockwise |
| 18a | 18g | Counterclockwise |

TABLE I-continued

| Inlet | Outlet | Drum Rotation |
|---|---|---|
| 18e | 18g | Counterclockwise |
| 18e | 18a | Counterclockwise |
| 18e | 18c | Counterclockwise |
| 18c | 18a | Clockwise |
| 18c | 18g | Clockwise |
| 18c | 18e | Clockwise |
| 18g | 18e | Clockwise |
| 18g | 18c | Clockwise |
| 18g | 18a | Clockwise |

The foregoing coaction and arrangement of the inlet and outlet panels, and the drum rotation is by way of example only. For most but not necessarily all operations, the sides 18d, 18h are to provide the auxiliary spaces 30, 32 for placement of air circulation apparatus (such as fans or blowers) and air return connections (or turnarounds). The sides 18b, 18f for most but not necessarily all operations are to provide the doors 28, 128, etc. The inlet and discharge or the outlet should be disposed at least 90° relative to each other at a perimeter of the freezer box, as Table I above shows.

Figure 5:
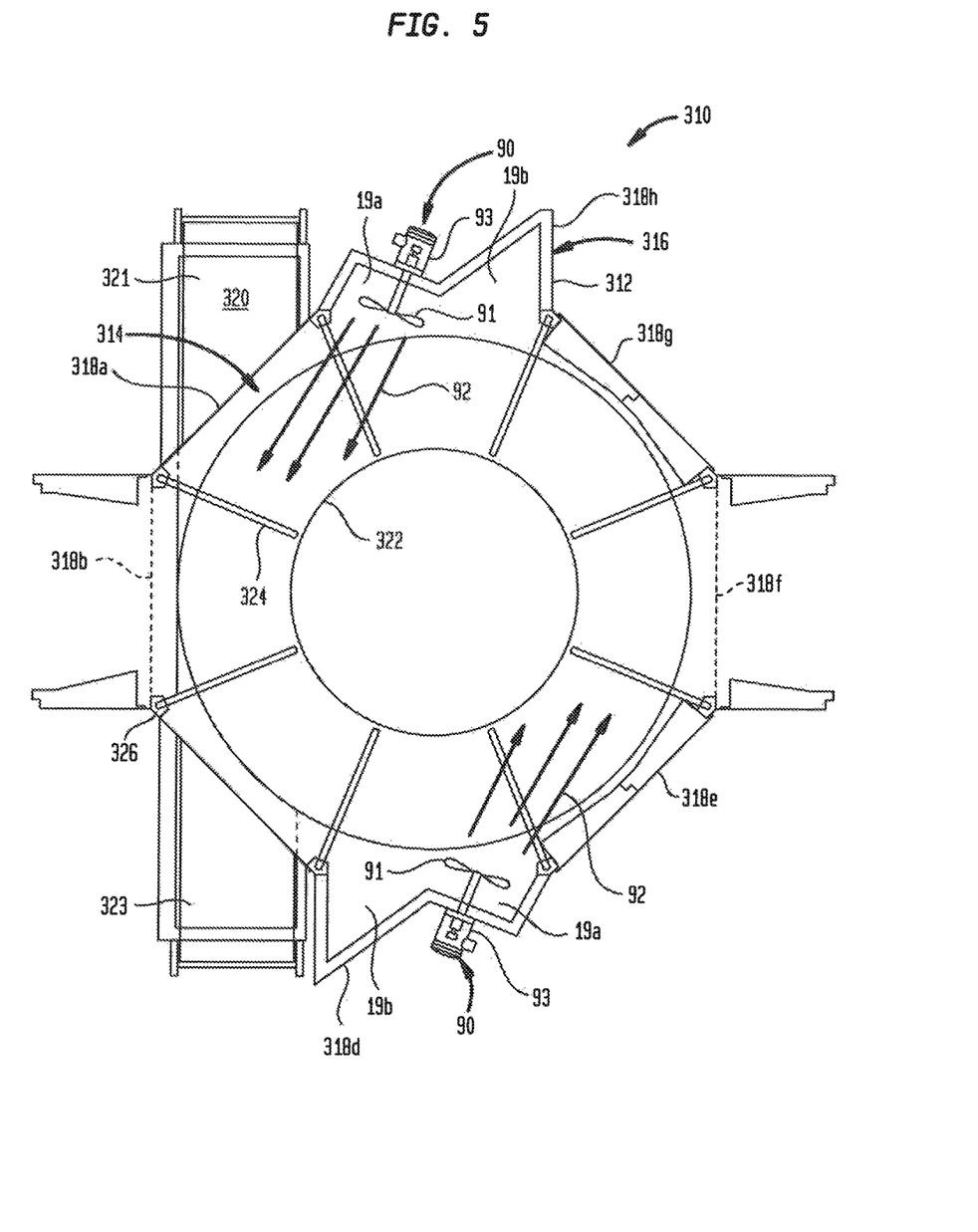
FIG. 5 shows a top schematic view of the embodiment of FIG. 1 with cross-flow circulation apparatus according to the present invention.
Figure 6:
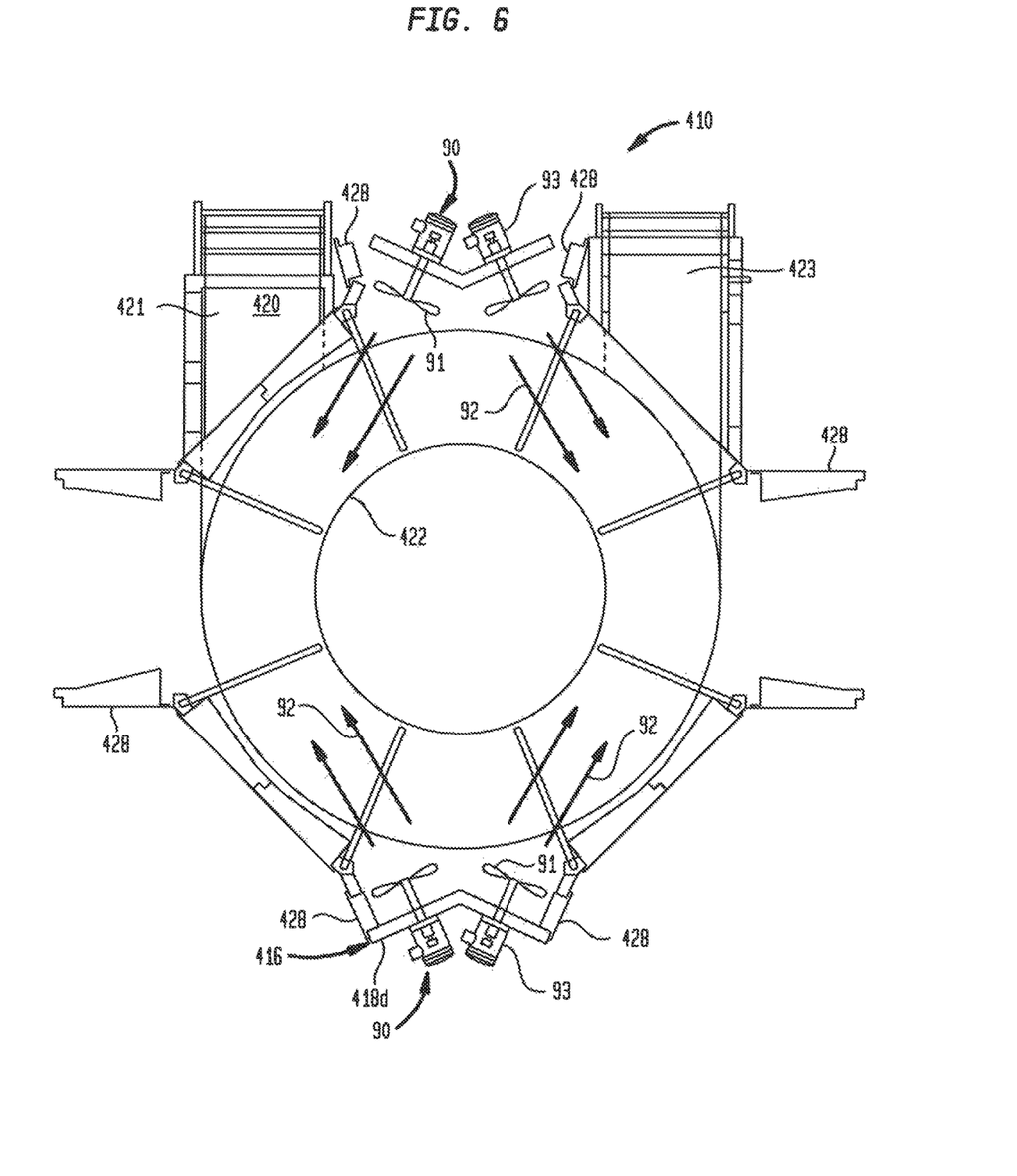
FIG. 6 shows a top schematic view of the embodiment of FIG. 3 with cross-flow circulation apparatus according to the present invention.

In FIGS. 5 and 6, the freezer apparatus embodiment 10 of FIG. 1, and the freezer apparatus embodiment 110 shown in FIG. 3, respectively, are arranged with at least one air circulation apparatus 90 and for many applications a plurality of the air circulation apparatus arranged at certain of the sides 18a-18h of the freezer box 316, 416. It is important to note that although the freezer apparatus 10 of FIG. 1, and any of the other freezer apparatus embodiments of the remaining Figures, are provided with an octaganally-shaped freezer box 16, 116, etc., it is possible that one or more of the sides 18a-18h may be of other than a planar shape, such as shown for example in FIG. 5 and FIG. 6. For purposes herein, reference to the air circulation apparatus 90 in the embodiment of FIG. 5 and for embodiments in the remaining Figures, includes circulation of the "atmosphere" within the freezer apparatus as air, a cryogen gas and/or a combination thereof, which may be circulated within the internal chamber 314 or other chambers of the other embodiments herein.

In particular and referring to FIG. 5, a freezer apparatus embodiment shown generally at 310 includes circulation apparatus 90 mounted for moving atmosphere within the internal chamber 314 and across the conveyor belt 320. The construction of the apparatus 310 includes the sides 318d, 318h designed and fabricated with a shape having said sides shown with a lesser volumetric portion 19a and a greater volumetric portion 19b. The shape of the portions 19a and 19b allows for circulating gas to expand in an area of the portion 19b behind the axial fan blades so this gas can be easily drawn into the fans and recirculated.

Each one of the circulation apparatus 90 includes at least one blower 91 or fan driven by a motor 93 mounted external to the housing 312 for operable coaction with the fan. This manner of construction prevents heat which would otherwise be generated from the motor being introduced into the internal chamber 314 which would compromise the chilling and/or freezing occurring to the products.

As shown in FIG. 5, the construction of the freezer apparatus embodiment 310 is a essentially the same as the freezer apparatus 10 shown in FIG. 1; except for the sides 318d, 318h, and the portions 19a, 19b.

The blower 91 of the circulation apparatus 90 is aimed at or in a direction to generate corresponding airflows 92 therefrom. The airflows 92 contact all tiers of the conveyor belt 320 guided or directed around the drum 322 at an angle of from 30 degrees to 45 degrees with respect to said conveyor belt as shown in FIG. 5. That is, the airflow 92 is not directed immediately at the drum 322 but rather, at an angle somewhat tangential thereto, so that the largest portion possible of the conveyor belt 320 is impacted by the airflow. The circulation apparatus 90 can each be positioned at any of the corresponding sides 318a-318h, but as shown in FIG. 5, mounting the circulation apparatus at opposed sides of the internal chamber 314 and angling same for the resulting airflows 92 promotes a circulatory effect at the interior chamber 314 to more thoroughly and uniformly contact the products to be chilled and/or frozen with the cryogen vapor of the airflow.

Referring to FIG. 6, the arrangement of the freezer apparatus embodiment is shown generally at 410. The construction of the apparatus 410 and operation thereof is similar to that as shown with respect to apparatus 110 of FIG. 3. However, the freezer 410 includes its sides 418h, 418d with corresponding door panels 428 which coact with the air circulation apparatus 490 to provide a space from which a pair of airflows 92 can be discharged from a plurality of the blowers 91 as shown in FIG. 6. That is, one pair of the air circulation apparatus 90 can be mounted at what would be the sides 418d, 418h so that each one of the pairs of air circulation apparatus are angled to provide corresponding divergent air flows 92 from each other. Each one of the pairs of air circulation apparatus 90 can be on the same plane or rather at a similar level with respect to the tiers of the conveyor belt as are the other pair of the air circulation apparatus. Alternatively, one pair of the air circulation apparatus 90 can be mounted to face for example an upper tier or tiers of the conveyor belt 420 circling the drum 422, while the other pair of the air circulation apparatus can be mounted to face for example a lower level or tier or tiers of the conveyor belt 420 so that there is provided a continuous air flow 92 in all directions through all tiers of the conveyor belt as same is directed around the drum 422.

Figure 7A:
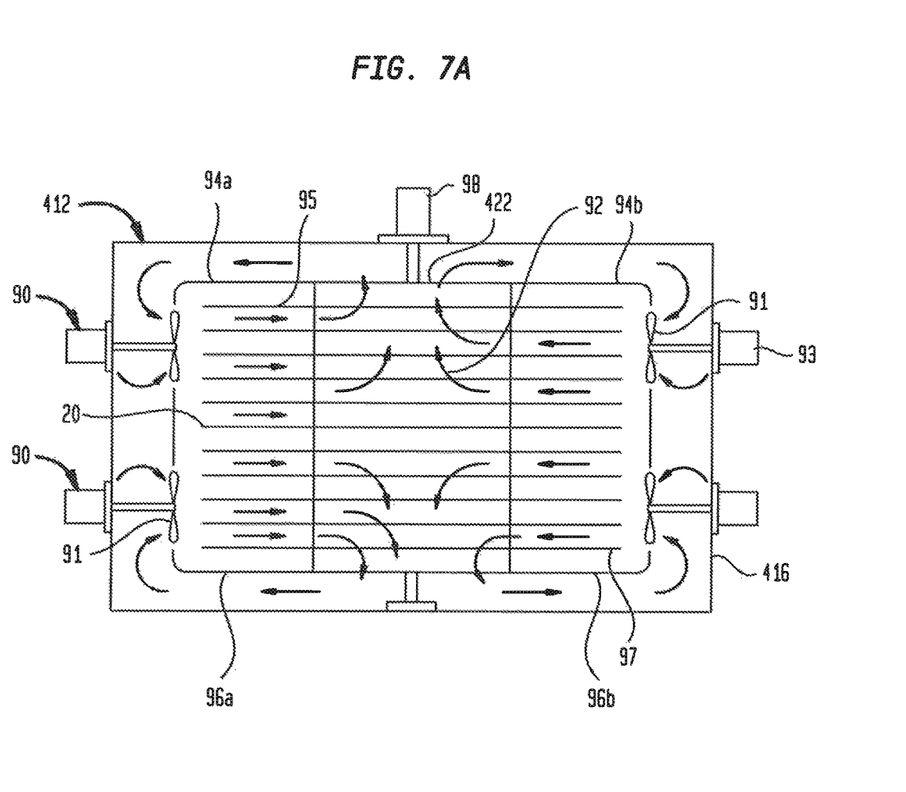
FIGS. 7A and 7B show side cross-sectional and top plan schematic views, respectively, of an arrangement of the cross-flow circulation apparatus for the gas flow patterns in the embodiments of FIGS. 1-6.
Figure 7B:
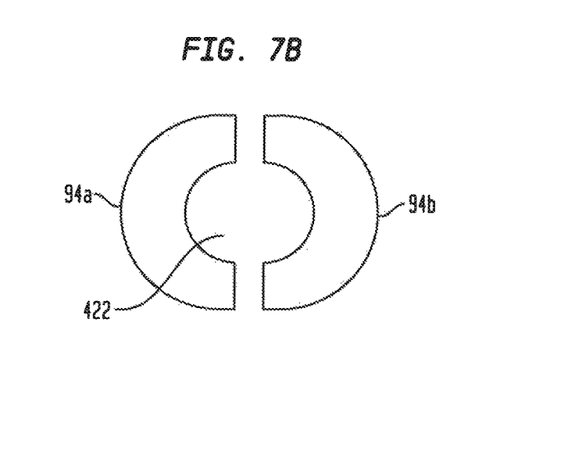

The embodiment shown in FIGS. 7A, 7B is similar to the embodiment of FIG. 6, except that the embodiment in said FIGS. 7A and 7B includes a first baffle 94 or upper baffle above an upper tier 95 of the conveyor belt, and a second baffle 96 or lower baffle beneath a lower tier 97 of the conveyor belt in the internal chamber 514. That is, FIGS. 7A and 7B show side and top views, respectively, of the same airflow arrangement. The baffles 94, 96 are each constructed as a pair of baffle plates and, as shown in particular in FIG. 7B, are positioned as an upper pair 94a, 94b of baffle plates and a lower pair 96a, 96b of baffle plates to force the airflow shown in FIG. 6 to move further into the stack and circulate back to the blowers 91. The baffles 94, 96 prevent gas flow from short circuiting, which may occur in the embodiment of FIG. 6. The drum 422 is driven in a clockwise or counterclockwise direction by a motor 98 operationally connected to the drum. The motor 98 may be disposed external to the housing 412.

In all of the embodiments shown in FIGS. 1, 2A-2B, and 3-7, the support cantilevers 24, 124, 224, extend toward but do not contact the drum 22, 122, 222, 322, 422.

There is therefore provided herein a plurality of embodiments of a reconfigurable freezer as described above and which embodiments also include the following elements.

Certain embodiments include a reconfigurable freezer, wherein a surface area at the internal space of the housing is octagonally-shaped.

Certain embodiments include a reconfigurable freezer, wherein a cross-section of the housing viewed from above said housing is octagonally-shaped.

Certain embodiments include a reconfigurable freezer, further comprising a conveyor belt transiting the internal space from the infeed assembly to the outfeed assembly, and a drum disposed at the internal space for supporting movement of the conveyor belt about the drum between the infeed and outfeed assemblies.

Certain embodiments include a reconfigurable freezer, wherein the infeed assembly and the outfeed assembly are at opposed sides of the housing.

Certain embodiments include a reconfigurable freezer, wherein the infeed assembly and the outfeed assembly are at a same side of the housing.

Certain embodiments include a reconfigurable freezer, wherein the infeed assembly and the outfeed assembly are disposed at the housing ninety degrees (90°) from each other.

Certain embodiments include a reconfigurable freezer, further comprising doors operable at a sidewall of the housing for providing access to the internal space.

Certain embodiments include a reconfigurable freezer, further comprising at least one blower disposed at the internal space for providing a gas flow across the conveyor belt within the internal space.

Certain embodiments include a reconfigurable freezer, wherein the housing comprises at least one region disposed within the housing and in fluid communication with the internal space for containing the at least one blower.

Certain embodiments include a reconfigurable freezer, further comprising a first compartment and a second compartment disposed at different sides of the housing, each of the first and second compartments in fluid communication with the internal space; and at least one first blower disposed in the first compartment, and at least one second blower disposed in the second compartment, the at least one first and second blowers facing the conveyor belt for providing first and second gas flows across said conveyor belt.

Certain embodiments include a reconfigurable freezer, wherein the infeed assembly comprises an infeed plenum through which the conveyor belt is directed to the drum.

Certain embodiments include a reconfigurable freezer, wherein the infeed plenum comprises an infeed exhaust in fluid communication with an interior of said infeed plenum.

Certain embodiments include a reconfigurable freezer, wherein the infeed plenum comprises an infeed panel mounted thereto for being positioned to removably cover at least one of the first and second openings external to the infeed plenum.

Certain embodiments include a reconfigurable freezer, wherein the outfeed assembly comprises an outfeed plenum through which the conveyor belt exits the internal space of the housing a belt drive apparatus operatively associated with the outfeed plenum and in operable contact with the conveyor belt and a drive motor operatively connected to and driving the belt drive apparatus and moving the conveyor belt between the infeed and outfeed assemblies and around the drum.

Certain embodiments include a reconfigurable freezer, wherein the outfeed plenum comprises an outfeed exhaust in fluid communication with an interior of said outfeed plenum.

Certain embodiments include a reconfigurable freezer, wherein the belt drive apparatus comprises a belt tensioner for maintaining a select amount of tension on the conveyor belt.

Certain embodiments include a reconfigurable freezer, wherein the outfeed assembly comprises an outfeed plenum surface sized and shaped for being removably mounted to cover at least one of the first and second openings.

Certain embodiments include a reconfigurable freezer, wherein the outfeed plenum, the belt drive apparatus, the drive motor, the outfeed exhaust and the belt tensioner are formed as an integral unit.

Certain embodiments include a reconfigurable freezer, further comprising a first compartment and a second compartment disposed at different sides of the housing, each of the first and second compartments in fluid communication with the internal space; and at least one blower disposed in the first compartment, said second compartment providing a return space for a gas flow to the first compartment.

Certain embodiments include a reconfigurable freezer, wherein the at least one blower is positioned to exhaust a gas flow transverse to a direction of movement of the conveyor belt.

Certain embodiments include a reconfigurable freezer, wherein the at least one blower is positioned to exhaust a gas flow in a direction similar to another direction of movement of the conveyor belt.

Certain embodiments include a reconfigurable freezer, further comprising at least one other blower disposed in the second compartment, said first compartment providing another return space for another gas flow from the second compartment.

Certain embodiments include a reconfigurable freezer, further comprising mechanical fasteners at the housing and the infeed and outfeed assemblies for removably mounting said assemblies to said housing.

Certain embodiments include a reconfigurable freezer, wherein the mechanical fasteners are selected from the group consisting of bolts, adaptor plates, locking nuts, and releasable latches.

Certain embodiments include a reconfigurable freezer, further comprising an upper baffle disposed above a top belt tier of the conveyor belt, and a lower baffle disposed beneath a lower belt tier of the conveyor belt, the upper and lower baffles directing gas flow toward the conveyor belt.

Certain embodiments include a reconfigurable freezer, wherein each one of the upper and lower baffles comprises a pair of baffle plates at opposed sides of the drum.

Certain embodiments include a reconfigurable freezer, wherein the conveyor belt at the infeed assembly is positioned at a first elevation with respect to the drum, and the conveyor belt at the outfeed assembly is positioned at a second elevation higher than the first elevation with respect to the drum.

Certain embodiments include a reconfigurable freezer, wherein the conveyor belt at the infeed assembly is positioned at a first elevation with respect to the drum, and the conveyor belt at the outfeed assembly is positioned at a second elevation lower than the first elevation with respect to the drum.

It will be understood that the embodiments described herein are merely exemplary, and that a person skilled in the art may make variations and modifications without departing from the spirit and scope of the invention. All such variations and modifications are intended to be included within the scope of the invention as defined herein and as provided in the appended claims. It should be understood that the embodiments described above are not only in the alternative, but can be combined.

What is claimed is:

1. A reconfigurable freezer, comprising:
   a housing having an internal space therein, and first and second openings each in communication with said internal space;
   an infeed assembly and an outfeed assembly, the infeed assembly constructed to be removably mounted to the housing at one of at the first and second openings for being in communication with said internal space, and the outfeed assembly constructed to be removably mounted to another of the first and second openings for being in communication with said internal space, wherein the infeed and outfeed assemblies are interchangeable at the first and second openings;
   a conveyor belt transiting the internal space from the infeed assembly to the outfeed assembly; and
   a drum disposed at the internal space for supporting movement of the conveyor belt about the drum between the infeed and outfeed assemblies;
   wherein the outfeed assembly comprises:
   an outfeed plenum through which the conveyor belt exits the internal space of the housing,
   a belt drive apparatus operatively associated with the outfeed plenum and in operable contact with the conveyor belt, and
   a drive motor operatively connected to and driving the belt drive apparatus and moving the conveyor belt between the infeed and outfeed assemblies and around the drum.

2. The freezer of claim 1, wherein a surface area at the internal space of the housing is octagonally-shaped.

3. The freezer of claim 1, wherein a cross-section of the housing viewed from above said housing is octagonally-shaped.

4. The freezer of claim 1, wherein the infeed assembly and the outfeed assembly are at opposed sides of the housing.

5. The freezer of claim 1, wherein the infeed assembly and the outfeed assembly are at a same side of the housing.

6. The freezer of claim 1, wherein the infeed assembly and the outfeed assembly are disposed at the housing ninety degrees (90°) from each other.

7. The freezer of claim 1, further comprising doors operable at a sidewall of the housing for providing access to the internal space.

8. The freezer of claim 1, further comprising at least one blower disposed at the internal space for providing a gas flow across the conveyor belt within the internal space.

9. The freezer of claim 8, wherein the housing comprises at least one region disposed within the housing and in fluid communication with the internal space for containing the at least one blower.

10. The freezer of claim 1, further comprising:
    a first compartment and a second compartment disposed at different sides of the housing, each of the first and second compartments in fluid communication with the internal space; and
    at least one first blower disposed in the first compartment, and at least one second blower disposed in the second compartment, the at least one first and second blowers facing the conveyor belt for providing first and second gas flows across said conveyor belt.

11. The freezer of claim 1, wherein the infeed assembly comprises an infeed plenum through which the conveyor belt is directed to the drum.

12. The freezer of claim 11, wherein the infeed plenum comprises an infeed exhaust in fluid communication with an interior of said infeed plenum.

13. The freezer of claim 11, wherein the infeed plenum comprises an infeed panel mounted thereto for being positioned to removably cover at least one of the first and second openings external to the infeed plenum.

14. The freezer of claim 1, wherein the outfeed plenum comprises an outfeed exhaust in fluid communication with an interior of said outfeed plenum.

15. The freezer of claim 14, wherein the belt drive apparatus comprises a belt tensioner for maintaining a select amount of tension on the conveyor belt.

16. The freezer of claim 1, wherein the outfeed assembly comprises an outfeed plenum surface sized and shaped for being removably mounted to cover at least one of the first and second openings.

17. The freezer of claim 15, wherein the outfeed plenum, the belt drive apparatus, the drive motor, the outfeed exhaust and the belt tensioner are formed as an integral unit.

18. The freezer of claim 1, further comprising:
a first compartment and a second compartment disposed at different sides of the housing, each of the first and second compartments in fluid communication with the internal space; and
at least one blower disposed in the first compartment, said second compartment providing a return space for a gas flow to the first compartment.

19. The freezer of claim 18, wherein the at least one blower is positioned to exhaust a gas flow transverse to a direction of movement of the conveyor belt.

20. The freezer of claim 18, wherein the at least one blower is positioned to exhaust a gas flow in a direction similar to another direction of movement of the conveyor belt.

21. The freezer of claim 18, further comprising at least one other blower disposed in the second compartment, said first compartment providing another return space for another gas flow from the second compartment.

22. The freezer of claim 1, further comprising mechanical fasteners at the housing and the infeed and outfeed assemblies for removably mounting said assemblies to said housing.

23. The freezer of claim 22, wherein the mechanical fasteners are selected from the group consisting of bolts, adaptor plates, locking nuts, and releasable latches.

24. The freezer of claim 1, further comprising an upper baffle disposed above a top belt tier of the conveyor belt, and a lower baffle disposed beneath a lower belt tier of the conveyor belt, the upper and lower baffles directing gas flow toward the conveyor belt.

25. The freezer of claim 24, wherein each one of the upper and lower baffles comprises a pair of baffle plates at opposed sides of the drum.

26. The freezer of claim 1, wherein the conveyor belt at the infeed assembly is positioned at a first elevation with respect to the drum, and the conveyor belt at the outfeed assembly is positioned at a second elevation higher than the first elevation with respect to the drum.

27. The freezer of claim 1, wherein the conveyor belt at the infeed assembly is positioned at a first elevation with respect to the drum, and the conveyor belt at the outfeed assembly is positioned at a second elevation lower than the first elevation with respect to the drum.

28. A reconfigurable freezer, comprising:
a housing having an internal space therein, and first and second openings each in communication with said internal space;
an infeed assembly and an outfeed assembly, the infeed assembly constructed to be removably mounted to the housing at one of at the first and second openings for being in communication with said internal space, and the outfeed assembly constructed to be removably mounted to another of the first and second openings for being in communication with said internal space, wherein the infeed and outfeed assemblies are interchangeable at the first and second openings;
a conveyor belt transiting the internal space from the infeed assembly to the outfeed assembly;
a drum disposed at the internal space for supporting movement of the conveyor belt about the drum between the infeed and outfeed assemblies;
a first compartment and a second compartment disposed at different sides of the housing, each of the first and second compartments in fluid communication with the internal space; and
at least one blower disposed in the first compartment, said second compartment providing a return space for a gas flow to the first compartment.

29. The freezer of claim 28, wherein a surface area at the internal space of the housing is octagonally-shaped.

30. The freezer of claim 28, wherein a cross-section of the housing viewed from above said housing is octagonally-shaped.

31. The freezer of claim 28, wherein the infeed assembly and the outfeed assembly are at opposed sides of the housing.

32. The freezer of claim 28, wherein the infeed assembly and the outfeed assembly are at a same side of the housing.

33. The freezer of claim 28, wherein the infeed assembly and the outfeed assembly are disposed at the housing ninety degrees (90°) from each other.

34. The freezer of claim 28, further comprising doors operable at a sidewall of the housing for providing access to the internal space.

35. The freezer of claim 28, further comprising at least one blower disposed at the internal space for providing a gas flow across the conveyor belt within the internal space.

36. The freezer of claim 35, wherein the housing comprises at least one region disposed within the housing and in fluid communication with the internal space for containing the at least one blower.

37. The freezer of claim 28, further comprising:
a first compartment and a second compartment disposed at different sides of the housing, each of the first and second compartments in fluid communication with the internal space; and
at least one first blower disposed in the first compartment, and at least one second blower disposed in the second compartment, the at least one first and second blowers facing the conveyor belt for providing first and second gas flows across said conveyor belt.

38. The freezer of claim 28, wherein the infeed assembly comprises an infeed plenum through which the conveyor belt is directed to the drum.

39. The freezer of claim 38, wherein the infeed plenum comprises an infeed exhaust in fluid communication with an interior of said infeed plenum.

40. The freezer of claim 38, wherein the infeed plenum comprises an infeed panel mounted thereto for being positioned to removably cover at least one of the first and second openings external to the infeed plenum.

41. The freezer of claim 28, wherein the outfeed assembly comprises:
an outfeed plenum through which the conveyor belt exits the internal space of the housing;

a belt drive apparatus operatively associated with the outfeed plenum and in operable contact with the conveyor belt; and a drive motor operatively connected to and driving the belt drive apparatus and moving the conveyor belt between the infeed and outfeed assemblies and around the drum.

42. The freezer of claim 41, wherein the outfeed plenum comprises an outfeed exhaust in fluid communication with an interior of said outfeed plenum.

43. The freezer of claim 42, wherein the belt drive apparatus comprises a belt tensioner for maintaining a select amount of tension on the conveyor belt.

44. The freezer of claim 41, wherein the outfeed assembly comprises an outfeed plenum surface sized and shaped for being removably mounted to cover at least one of the first and second openings.

45. The freezer of claim 43, wherein the outfeed plenum, the belt drive apparatus, the drive motor, the outfeed exhaust and the belt tensioner are formed as an integral unit.

46. The freezer of claim 28, wherein the at least one blower is positioned to exhaust a gas flow transverse to a direction of movement of the conveyor belt.

47. The freezer of claim 28, wherein the at least one blower is positioned to exhaust a gas flow in a direction similar to another direction of movement of the conveyor belt.

48. The freezer of claim 28, further comprising at least one other blower disposed in the second compartment, said first compartment providing another return space for another gas flow from the second compartment.

49. The freezer of claim 28, further comprising mechanical fasteners at the housing and the infeed and outfeed assemblies for removably mounting said assemblies to said housing.

50. The freezer of claim 49, wherein the mechanical fasteners are selected from the group consisting of bolts, adaptor plates, locking nuts, and releasable latches.

51. The freezer of claim 28, further comprising an upper baffle disposed above a top belt tier of the conveyor belt, and a lower baffle disposed beneath a lower belt tier of the conveyor belt, the upper and lower baffles directing gas flow toward the conveyor belt.

52. The freezer of claim 51, wherein each one of the upper and lower baffles comprises a pair of baffle plates at opposed sides of the drum.

53. The freezer of claim 28, wherein the conveyor belt at the infeed assembly is positioned at a first elevation with respect to the drum, and the conveyor belt at the outfeed assembly is positioned at a second elevation higher than the first elevation with respect to the drum.

54. The freezer of claim 28, wherein the conveyor belt at the infeed assembly is positioned at a first elevation with respect to the drum, and the conveyor belt at the outfeed assembly is positioned at a second elevation lower than the first elevation with respect to the drum.

55. A reconfigurable freezer, comprising:
a housing having an internal space therein, and first and second openings each in communication with said internal space;
an infeed assembly and an outfeed assembly, the infeed assembly constructed to be removably mounted to the housing at one of at the first and second openings for being in communication with said internal space, and the outfeed assembly constructed to be removably mounted to another of the first and second openings for being in communication with said internal space, wherein the infeed and outfeed assemblies are interchangeable at the first and second openings;
a conveyor belt transiting the internal space from the infeed assembly to the outfeed assembly;
a drum disposed at the internal space for supporting movement of the conveyor belt about the drum between the infeed and outfeed assemblies;
an upper baffle disposed above a top belt tier of the conveyor belt, and a lower baffle disposed beneath a lower belt tier of the conveyor belt, the upper and lower baffles directing gas flow toward the conveyor belt.

56. The freezer of claim 55, wherein a surface area at the internal space of the housing is octagonally-shaped.

57. The freezer of claim 55, wherein a cross-section of the housing viewed from above said housing is octagonally-shaped.

58. The freezer of claim 55, wherein the infeed assembly and the outfeed assembly are at opposed sides of the housing.

59. The freezer of claim 55, wherein the infeed assembly and the outfeed assembly are at a same side of the housing.

60. The freezer of claim 55, wherein the infeed assembly and the outfeed assembly are disposed at the housing ninety degrees (90°) from each other.

61. The freezer of claim 55, further comprising doors operable at a sidewall of the housing for providing access to the internal space.

62. The freezer of claim 55, further comprising at least one blower disposed at the internal space for providing a gas flow across the conveyor belt within the internal space.

63. The freezer of claim 62, wherein the housing comprises at least one region disposed within the housing and in fluid communication with the internal space for containing the at least one blower.

64. The freezer of claim 55, further comprising:
a first compartment and a second compartment disposed at different sides of the housing, each of the first and second compartments in fluid communication with the internal space; and
at least one first blower disposed in the first compartment, and at least one second blower disposed in the second compartment, the at least one first and second blowers facing the conveyor belt for providing first and second gas flows across said conveyor belt.

65. The freezer of claim 55, wherein the infeed assembly comprises an infeed plenum through which the conveyor belt is directed to the drum.

66. The freezer of claim 65, wherein the infeed plenum comprises an infeed exhaust in fluid communication with an interior of said infeed plenum.

67. The freezer of claim 65, wherein the infeed plenum comprises an infeed panel mounted thereto for being positioned to removably cover at least one of the first and second openings external to the infeed plenum.

68. The freezer of claim 55, wherein the outfeed assembly comprises:
an outfeed plenum through which the conveyor belt exits the internal space of the housing;
a belt drive apparatus operatively associated with the outfeed plenum and in operable contact with the conveyor belt; and
a drive motor operatively connected to and driving the belt drive apparatus and moving the conveyor belt between the infeed and outfeed assemblies and around the drum.

69. The freezer of claim 68, wherein the outfeed plenum comprises an outfeed exhaust in fluid communication with an interior of said outfeed plenum.

70. The freezer of claim 69, wherein the belt drive apparatus comprises a belt tensioner for maintaining a select amount of tension on the conveyor belt.

71. The freezer of claim 68, wherein the outfeed assembly comprises an outfeed plenum surface sized and shaped for being removably mounted to cover at least one of the first and second openings.

72. The freezer of claim 70, wherein the outfeed plenum, the belt drive apparatus, the drive motor, the outfeed exhaust and the belt tensioner are formed as an integral unit.

73. The freezer of claim 55, further comprising:
a first compartment and a second compartment disposed at different sides of the housing, each of the first and second compartments in fluid communication with the internal space; and
at least one blower disposed in the first compartment, said second compartment providing a return space for a gas flow to the first compartment.

74. The freezer of claim 73, wherein the at least one blower is positioned to exhaust a gas flow transverse to a direction of movement of the conveyor belt.

75. The freezer of claim 73, wherein the at least one blower is positioned to exhaust a gas flow in a direction similar to another direction of movement of the conveyor belt.

76. The freezer of claim 73, further comprising at least one other blower disposed in the second compartment, said first compartment providing another return space for another gas flow from the second compartment.

77. The freezer of claim 55, further comprising mechanical fasteners at the housing and the infeed and outfeed assemblies for removably mounting said assemblies to said housing.

78. The freezer of claim 77, wherein the mechanical fasteners are selected from the group consisting of bolts, adaptor plates, locking nuts, and releasable latches.

79. The freezer of claim 55, wherein each one of the upper and lower baffles comprises a pair of baffle plates at opposed sides of the drum.

80. The freezer of claim 55, wherein the conveyor belt at the infeed assembly is positioned at a first elevation with respect to the drum, and the conveyor belt at the outfeed assembly is positioned at a second elevation higher than the first elevation with respect to the drum.

81. The freezer of claim 55, wherein the conveyor belt at the infeed assembly is positioned at a first elevation with respect to the drum, and the conveyor belt at the outfeed assembly is positioned at a second elevation lower than the first elevation with respect to the drum.

* * * * *